(12) United States Patent
Li et al.

(10) Patent No.: US 6,938,045 B2
(45) Date of Patent: Aug. 30, 2005

(54) IMAGE SERVER SYNCHRONIZATION (75) Inventors: Chia-Hsin Li, San Jose, CA (US); Jason Harris, Mountain View, CA (US)

(73) Assignee: Seiko Epson Corporation, Tokyo (JP)

( * ) Notice: Subject to any disclaimer, the term of this patent is extended or adjusted under 35 U.S.C. 154(b) by 498 days.

(21) Appl. No.: 10/051,337

(22) Filed: Jan. 18, 2002

(65) Prior Publication Data

US 2003/0140050 A1 Jul. 24, 2003

(51) Int. Cl.$^7$ ............................................. G06G 17/30
(52) U.S. Cl. ...................... 707/100; 707/200; 707/203; 709/226
(58) Field of Search .............................. 707/1, 200, 201, 707/203, 100; 709/223, 224, 225, 226; 711/100, 104, 105

(56) References Cited

U.S. PATENT DOCUMENTS

| | | | | |
|---|---|---|---|---|
| 5,794,251 A | * | 8/1998 | Watanabe et al. | 707/200 |
| 5,819,272 A | | 10/1998 | Benson | 707/8 |
| 5,870,759 A | * | 2/1999 | Bauer et al. | 707/201 |
| 5,870,765 A | | 2/1999 | Bauer et al. | 707/203 |
| 5,884,325 A | | 3/1999 | Bauer et al. | 707/201 |
| 5,924,096 A | | 7/1999 | Draper et al. | 707/10 |
| 5,926,816 A | | 7/1999 | Bauer et al. | 707/8 |
| 5,944,789 A | * | 8/1999 | Tzelnic et al. | 709/214 |
| 5,956,727 A | | 9/1999 | Cheng et al. | 707/102 |
| 5,961,590 A | | 10/1999 | Mendez et al. | 709/206 |
| 5,978,813 A | | 11/1999 | Foltz et al. | 707/201 |
| 5,995,980 A | | 11/1999 | Olson et al. | 707/201 |
| 6,055,527 A | * | 4/2000 | Badger et al. | 707/2 |
| 6,065,018 A | | 5/2000 | Beier et al. | 707/202 |
| 6,560,615 B1 | * | 5/2003 | Zayas et al. | 707/202 |

* cited by examiner

Primary Examiner—Greta Robinson
Assistant Examiner—Cheryl Lewis
(74) Attorney, Agent, or Firm—Rosalio Haro (57) ABSTRACT A package of local files are maintained in a first local computing device and a descriptive record of the local files is maintained in a second local computing device. A directory-modified-date parameter within the first local computing device and a file-modified-date parameter in the second local computing device, but updated in accordance with a local clock from the first local computing device, are used to maintain the descriptive record in the second local computing device synchronized with changes to the local files in the first local computing device. Copies of the descriptive record and package of local files are maintained in a remote computing system. A first package-modified-date, PMD, parameter in the second local computing device and a second PMD parameter in the remote computing system are used to maintain the copies in the remote computing system synchronized with those in first and second local computing devices.

47 Claims, 5 Drawing Sheets

IMAGE SERVER SYNCHRONIZATION

BACKGROUND OF THE INVENTION

1. Field of the Invention

The present invention relates to a computer system architecture for synchronizing changes to a package of files on a first computing system with index data, or database, on a second computing system that maintains data descriptive of the package of files. The present invention also relates to a computer system architecture for synchronizing two remote, and independent, computer servers intended for maintaining duplicates of each other's files.

2. Description of the Related Art

In computing networks where a first machines is used to maintain a database, or index data, of a plurality of files stored in one or more other machines, it is important that the data in the database accurately reflect the current state of the plurality of files stored in the other machines. That is, changes to the files stored in the other machines should be accurately reflected in the database stored in the first machine. This is especially true when the first machine is used as an interface for a network server and its job is to provide accurate information of, and access to, the files stored in the other machines. Such a network server architecture may be used, for example, to implement a an image server system.

As it is known in the art, an operating system often assigns an updated time-stamp to a file when the file is modified. Thus, one way of reducing the amount of mismatch between the database in the first machine and the image files stored in the other machines is to store each file's modified time-stamp along with other characteristic data for each file in the database. In this manner, the database can determine if its stored characteristic data associated with a specific file is accurate by comparing the file's stored time-stamp with the stored file's actual modified time-stamp. This approach, however, requires that the database implement a separate time-stamp comparison for each file, which can considerably slow down a system if the number of files is high.

Additionally, since the image files are stored in separate machines, it is possible to update, erase, or add files to the other machines without informing the first machine that maintains the database. In this case, if a new file is added, the database will have no way of knowing of the change unless it is explicitly informed of the addition. This is because the database's only method of synchronizing itself with the stored image files is through the use of each file's previously stored modification time-stamp. But if a new file is added to one of the other machines, then no data regarding the new file is yet stored in the database, and the database can thus not discern any changes. The database therefore remains ignorant of added new file.

This is also the case with other simple changes such the renaming of a file. Unless the database is explicitly informed of the change, it will have no way of synchronizing itself to the change.

The prior art thus requires that the database be explicitly informed of any changes to the stored files, on a change-by-change basis. Furthermore, the database itself has no way of identifying some types of changes, as recited above, and will thus remain ignorant of those types of changes if the communication link between the database and an other machine in which the change takes place is broken such that the other machine is not able to inform the database of the change at the time the change takes place.

This synchronization problem is exacerbated as the database itself is copied onto multiple remote servers. The database may, for example, be part of a local server, and the other machines on which the files are stored may likewise be local to the local server. The local sever may provide remote users access to the stored image file through a networks such as the internet. However, in cases where the number of remote users, or the distance between remote users and the local server is large, access to the image files may be slow.

In such cases, it is often useful to have an additional remote database network to help service the remote users. The remote database network acts as a mirror site, and consists of a remote database having a remote index of files stored on remote servers that hold copies of the image files. However, It is possible to independently alter files on either the local server or the remote servers. Therefore, it becomes more difficult to assure continuity between the local server, which maintains the local database network, and the remote database network of the remote servers. This problem is exacerbated in cases where no direct link is maintained between the local database network and remote database network such that the local and remote networks cannot inform each other of changes as they occur. Additionally, since the local and remote networks do not maintain a constant communication link with each other, they each execute their computing tasks independently according to their own respective local clocks. This further complicates the synchronizing of changes among the multiple servers since they do not have a common clock reference with which to track changes by comparing time stamps of file modifications with independent clocks. In other words, since the remote servers function independently, and each may be in different time zones, the modification time-stamp associated with a file modification cannot be directly compared to determine which server has the most recent version of a file.

OBJECTS OF THE INVENTION

It is an object of the present invention to provide a file organization system that the permits a database on a first computing device to synchronize itself with changes to a an associated file package in another computing devices without requiring that the database be notified of modifications to the file package on a change-by-change basis.

It is another object of the present invention to provide a file organization architecture wherein a database itself can identify the addition or renaming of files in an associated file package.

It is yet another object of the present invention to provide a file organization system wherein multiple remote servers can determine among themselves which of them has the most recent version of a file package, and thereby update any remote server that does not have the most recent version of the file package.

SUMMARY OF THE INVENTION

The above objects are met in a file organization system having two aspects to its architecture. A first aspect provides a File-Modified-Date (FMD) parameter and a Directory-Modified-Date (DMD) parameter used for synchronizing changes made to a file package (i.e. a collection of files) stored in a first computing device with an associated database, or index data, maintained in a second computing device. A second aspect of the invention assumes that the first and second computing devices are part of a local, first file server, and provides a first Package-Modified-Date (PMD) parameter stored within the first file server and associated with a specific file package, and provides a second Package-Modified-Date (PMD) parameter stored in a second database maintained in a remote, second file server. The first and second PMD parameters permit the local file server and the remote file server to synchronize their respective databases and associated file packages.

In the following summary, it is assumed that the local server includes a first computing device for storing the collection of files that constitute the file package, and also includes a second computing device on which is maintained the database, i.e. index data or data record, associated with the file package. It is to be understood that the file package and data record may be stored in any of many data storage devices, such as a hard drive, IC memory (i.e. flash, eeprom, eprom, dram, sram, etc.), optical-magnetic recording media, or other type of computing readable medium.

Each file package consists of a plurality of files and has associated with it a Directory-Modified-Date, DMD, parameter that is updated according to the first computing device's local clock each time the file structure of the file package is altered. For example, the DMD parameter may be updated each time a file in the file package is renamed or deleted, or each time a new file is added.

Each data record associated with a file package includes a File-Modified-Date, FMD, parameter updated under different conditions. If a file in a file package is amended, then the FMD parameter of the associated data record (which is located in the second computing device) will be updated in accordance to one of either the local clock from the first computing device or, more preferably, the local clock from the second computing device.

When a local synchronization routine is initiated to synchronize the data record with its associated file package, their respective PMD and FMD parameters are examined to determined which indicates a more recent change. If the FMD parameter indicates a more recent change, then no further updates are necessary. If the DMD parameter indicates a more recent change, then the first computing devices updates the data record in the second computing device. Furthermore, the FMD parameter in the second computing device made equal to the DMD parameter from the first computing device.

As stated above, a Package-Modified-Date (PMD) parameter is used to synchronize data records and file packages among multiple file servers. For example, it is assumed that the above described first computing device and second computing device constitute a local file server. Copies of their data record and file package are maintained in a remote file server that has access to the local file server via a network link, such as the internet. The local file server has a first PMD parameter, i.e. PMD_1, and the remote file server has a second PMD parameter, i.e. PMD_2.

In the present file organization system, updates to a data record resulting from a synchronization routine with its local file package (such as between the above described first and second computing devices) are identified as a "local synchronization routine", and updates to a data record resulting from a synchronization routine between the local file server and the remote file server are identified as a "remote synchronization routine". Each file server updates its respective PMD parameter in accordance with its respective local clock in response to a change to its respective data record resulting from a local synchronization routine with its local file package. Furthermore, each file server may include multiple "data record"-to-"file package" pairs. In one embodiment, each file server has only one PMD parameter, which is updated every time any of its "data record"-to-"file package" pairs is updated. In this manner, its PMD parameter would always correspond to the most recent change to any of its "data record"-to-"file-package" pairs. In an alternate embodiment, each file server maintains a separate PMD parameter per "data record"-to-"file package" pair, and can thus executive a separate remote synchronization routine for each "data record"-to-"file package" pair.

In either of the above embodiments, when either of the local or remote file server initiates a remote synchronization routine, their respective PMD parameters are examined. Whichever PMD parameter indicates a more recent change, is assumed to have the correct version of the "data record"-to-"file package" pair under test. The file server that has the correct version of the "data record"-to-"file package" pair under test then updates the "data record"-to-"file package" pair in the other file server.

At the end of the remote update, the file server that had its "data record"-to-"file package" pair updated also updates its PMD parameter. In the preferred embodiment, the PMD parameter is updated by being made equal to the PMD parameter from the other file server, which housed the correct version of the "data record"-to-"file package" pair. Alternatively, however, the PMD parameter may be updated by being made equal to the current time according to its file server's local clock.

Various approaches are described in the present invention for determining which of the PMD parameter from local file server, or the PMD parameter from the remote file server, indicates the most recent change to its corresponding "data record"-to-"file package" pair. In a first approach, the local server sends a first test-time-stamp according to its local clock along with its PMD_1 parameter to the remote file server. Similarly, the remote file sever sends a second test-time-stamp according to its local clock along with its PMD_2 parameter to the local file server. Each file server then identifies an offset-time as the difference between its local time as determined by its local clock and the test-time-stamp received from the other file server. For example, the remote file server would identify an offset-time as the difference between its local time and the received first test-time. Alternatively, the remote file server may identify the offset-time as the difference between the second-time stamp and the first-time stamp. The identified offset-time is then added or subtracted, as appropriate, to one of the PMD parameters (such as PMD_1) to shift it to the same timing reference as the other PMD parameter (i.e. PMD_2 in this case).

Alternatively, each file server may determine a period-since-last-change time by taking the difference between its local time according to its local clock and its own PMD parameter. The file servers then exchange period-since-last-change time values. The file server with the shortest period since its last change to its PMD parameter is assumed to have the most recent "data record"-to-"file package" pair, and upgrades the other of file server.

Alternatively, the local and remote file servers may designate the local clock resident within one of local and remote file servers (or a some other clock accessible to both file servers on the network) as a master reference clock. In this case, both the local and remote file servers update their respective PMD parameters in accordance to the designated master reference clock in response to both a local and remote synchronization routine. In this way, the PMD parameters of all file serves will be based on the same master clock in spite of each file server having a different local clock.

As explained before, in all of the above embodiments, it is preferred that each file server update its corresponding PMD parameter according to its local clock in response to its file record being updated during a local synchronization routine. In the above example, during a remote synchronization routine, the file servers that has its file record updated sets its PMD parameter equal to the PMD parameter that is determined to have the most recent "data record"-to-"file package" pair.

In still an alternate approach, both the local and remote file servers may determine which of them has the most recent "data record"-to-"file package" pair by comparing their respective PMD parameters directly. The file server having the most recent PMD parameter, is designated as having the most recent "data record"-to-"file package" pair, and it updates to other file server.

BRIEF DESCRIPTION OF THE DRAWINGS

In the drawings wherein like reference symbols refer to like parts.

DESCRIPTION OF THE PREFERRED EMBODIMENTS

Figure 1:
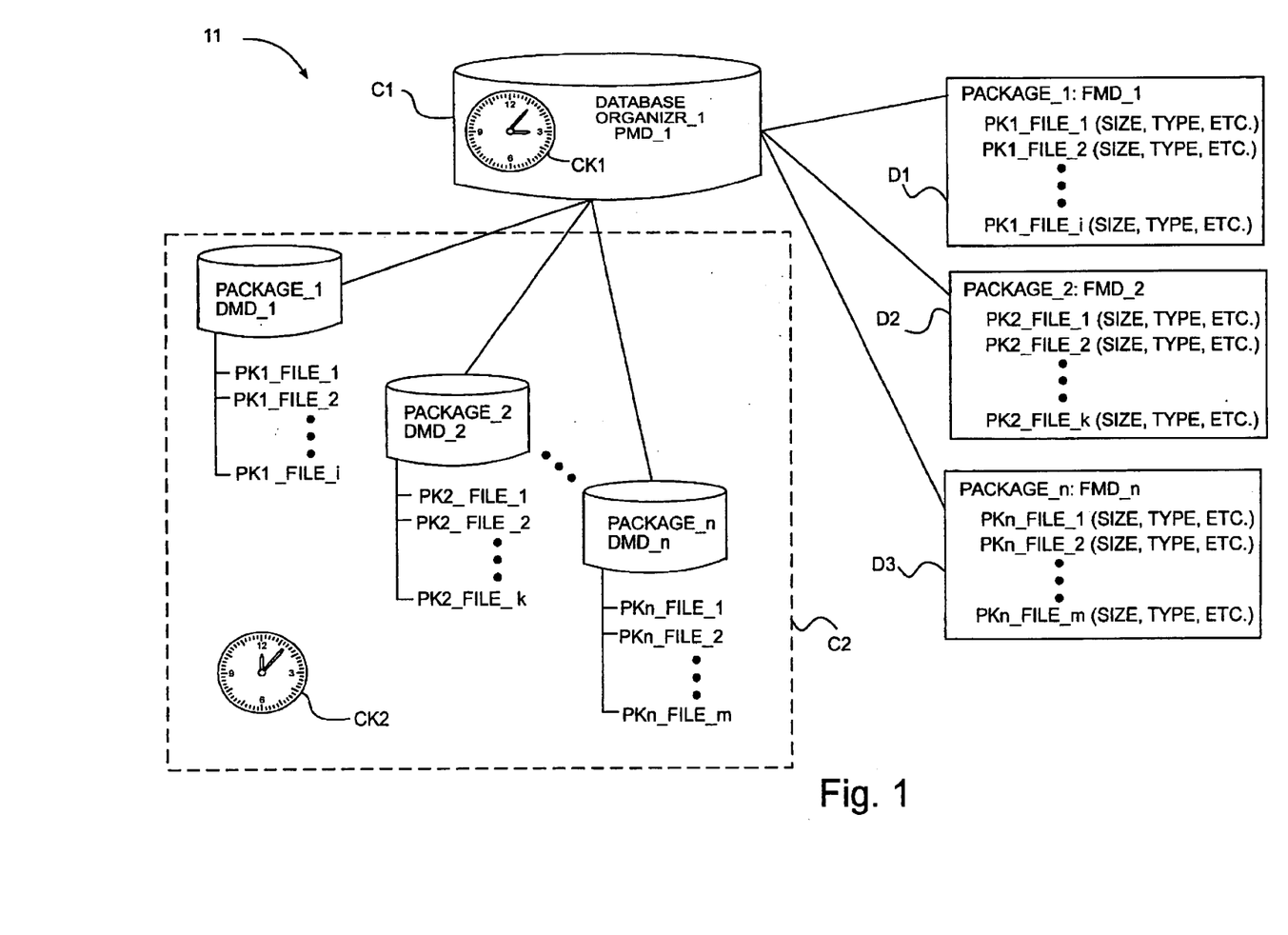
FIG. 1 is a block diagram of a local file organization system in with the present invention.

With reference to FIG. 1, a file organization system in accord with the present invention preferably includes a database organizer, identified as database organizer_1, for maintaining a descriptive record of a plurality of local files. Database organizer_1 is shown implemented in a first computing device C1 while local files pk1_file_1 through pkn_file_m are illustratively maintained in a storage space within a second computing device C2. Alternatively, both the local files and their corresponding descriptive record, i.e. its corresponding database organizer, may be resident within a single computing device.

In the presently preferred embodiment of FIG. 1, the local files are arranged into multiple file packages, package_1 through package_n. Each file package may, for example, be implemented as a directory, or file folder, in which a plurality of local files are stored. For example, package_1 may designate a directory in which are stored local files pk1_file_1 through pk1_file_i. Similarly, package_2 may likewise be implemented as a directory in which are stored local files pk2_file_1 through pk2_file_k, and so on through package_n, which holds local files pkn_file_1 through pkn_file_m.

In the present illustrative example, each of package_1 through package_n contain a collection of image files. It is preferred that the image files within each package have a related theme, but this is not critical to the invention. In addition to the related image files, each package preferably includes a thumbnail representation file corresponding to each image file. As it is known in the art, a thumbnail representation file is a reduced (in size and quality) representation of a larger, image file, and thereby provides a quick reference to its corresponding larger image file while requiring less storage space and less image processing time.

Second computing device C2 has its own local clock CK2 used to keep track of changes to its resident file packages. For example, each of package_1 through package_n includes a Directory-Modified-Date, DMD, parameter for storing a date stamp, as determined by clock CK2, corresponding to the most recent file structure modification of each package. For example, DMD_1 of package_1 receives an updated time-stamp each time any of its corresponding local files (pk1_file_1 through pk1_file_i) is deleted or renamed, or each time a new file is added to, or removed from, package_1. Thus, DMD_1 maintains a time stamp corresponding to the most recent change to the file structure within package_1. Further preferably, every time DMD_1 is updated, second computing device C2 determines the cause of the updated DMD_1 time stamp. If DMD_1 was updated due to an image file being renamed, then the image file's corresponding thumbnail file is renamed accordingly, or otherwise modified to maintain its association with the renamed image file. Alternatively, if DMD_1 was updated due to an image file being deleted, then the deleted image file's corresponding thumbnail file is likewise deleted. Similarly, if DMD_1 was updated due to a new image file being added to package_1, then second computing device generates a new thumbnail representation file corresponding to the newly added image file, and incorporates it into package_1.

Each of package_2 through package_n have a corresponding Directory-Modified-Date, DMD_2 through DMD_n, that is updated to the current time according to clock CK2 in response to similar modifications to their respective file structure.

As stated above, database organizer_1 in first computing device C1 maintains a descriptive record of the local files stored in second computing device C2. Since second computing device may organize the local files into multiple file packages, i.e. package_1 through package_n, database organizer_1 preferably maintains a separate descriptive record D1 though Dn, one for each of respective file packages, package_1 through package_n. Each descriptive record, D1 through Dn, preferably maintains similar information regarding its respective file package, and therefore only descriptive recorder D1 is described in detail with the understanding that descriptive records D2 through Dn are similarly organized.

Descriptive record D1 maintains information regarding local files within package_1. For example, descriptive record D1 may store the file name, file size, file type, and other data as required, corresponding to each of files pk1_file_1 through pk1_file_i. Additionally, each of descriptive records D1 through Dn include a respective File-Modified-Date, FMD, parameter corresponding to a time stamp supplied by second computing device C2 and used as an estimation of the time at which the latest modification to a files within a corresponding file package took place.

In a first preferred embodiment of the present invention, there is only one FMD parameter for each file package, such that the FMD parameter corresponding to the time stamp identifying the most recent modification to any of the files within a file package. In a first arrangement, the FMD parameter would be updated every time any file is modified. In a second arrangement, the FMD parameter is updated during the execution of a synchronization routine, and is not necessarily assigned a time-stamp corresponding to the modification of a file. Instead, the FMD parameter is made dependent on the DMD parameter, as explained more fully below.

In one of the preferred embodiments, a descriptive record's FMD parameter may be updated only in response to a synchronization request, which may originate from first computing device C1 or second computing device C2. In an alternate embodiment, the synchronization request may be instigated by either database organizer_1 or any of the file packages, i.e. package_1 through package_n. In either case, it is preferable that the synchronization of a file package and its corresponding descriptive record be implemented on an one-to-one basis.

When it is desired to coordinate the content of descriptive records D1 to Dn with their corresponding file package, package_1 to package_n, one of first or second computing devices C1 and C2 initiates a synchronization routine. Preferably, the synchronization routines are targeted such that each instigation of the synchronization routine may designate one, specific descriptive record and its corresponding file package. For example, if second computing device C2 initiates a synchronization routing designating descriptive record D2, the first computing device sends parameter FMD_2 to second computing device C2, and the second computing device C2 sends parameter DMD_2 to first computing device C1. FMD_2 is compared with DMD_2, and if it is found that FMD_2 is more current than DMD_2, then no further synchronization is required. However, if DMD_2 has a more recent data stamp than FMD_2, then descriptive data D2 undergoes an updated sequence.

Several update sequences are contemplated within the scope of the present invention. The objective of the update sequence is to assure that the descriptive data D2 corresponds correctly to the current state of local files pk2_file_1 to pk2_file_k within package_2. In a first update sequence, second computing device C2 sends file structure information of all file packages to first computing device C1. The file structure information may includes the name, size, and type description for all of its local files within each package, such as files pk2_file_1 through pk2_file_k in package_2. Database organizer_1 then generates new descriptive data corresponding to the received data.

In an alternate preferred embodiment, whichever of first computing device C1 or second computing device C2 that initiated the synchronization routine, also identifies a target file package for updating. In the present example, file package_2 would be identified. Second computing device C2 then sends the file structure information of the target file package to first computing device C1. Database organizer_1 responds by updating the descriptive data, or generating new descriptive data, corresponding to the target file package.

Figure 2:
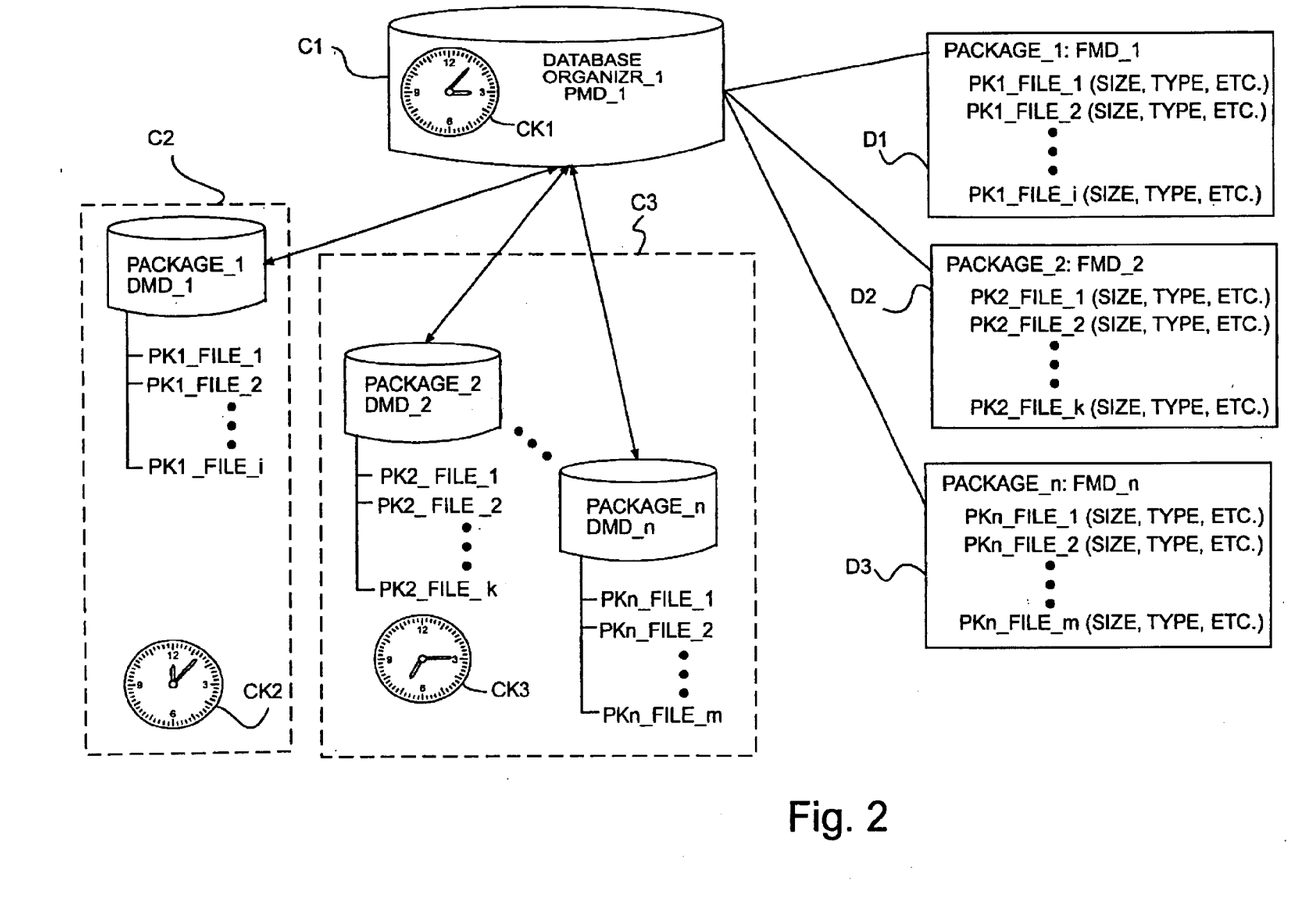
FIG. 2 is a block diagram of an alternate configuration for a local file organization system in accord with the present invention.

With reference to FIG. 2, an alternate embodiment of the present invention provides multiple local computing devices, C2 and C3, for storing files packages, all in communication with the same database organizer_1 in computing device C1. All elements in FIG. 2 similar to those of FIG. 1 are identified by similar reference characters and are described above. In this alternate embodiment, second computing device C2 stores only one file package, i.e. package_1, while a third computing device C3 stores package_2 through package_n. It is to be understood that it is equally possible to have each file package stored in a separate computing device, or multiple file packages stored in a plurality of computing devices.

This present embodiment functions substantially similar to the embodiment of FIG. 1 described above with the exception that Directory-Modify-Date parameters DMD_2 through DMD_n are dependent on CK3, the local clock of third computing device C3, while parameter DMD_1 is dependent on the CK2, the local clock of second computing device C2. Each of computing devices C2 and C3 can initiate a synchronization routine with database organizer_1 in first computing device C1. however, it is preferred that each of second C2 and third C3 computing devices be able to initiate a synchronization routine only for the respective file packages that they house. For example, second computing device C2 can initiate a synchronization routine identifying package_1 as the target since package_1 is resident within computing device C2. Similarly, computing device C3 can initiate a synchronization routine for any of the file packages resident within itself. That is, computing device C3 may initiate a synchronization routine for any of file package_2 through package_n.

The Directory-Modified-Date parameter within each file package is updated to the current time according to the respective local clock of the computing device within which the file package is stored. For example, DMD_1 within package_1 is updated in accordance with clock CK2, which is within second computing device C2. Similarly, DMD_2 through DMD_n, which reside within third computing device C3, are updated in accordance with CK3, the local clock within third computing device C3. Since any synchronization of a file package_1 through package_n with its corresponding descriptive data D1 through Dn is done on a one-to-one basis, it is not necessary that all file packages use the same reference clock. For example, if database organizer_1 initiates a synchronization routine for descriptive data D2 (corresponding to package_2 in third computing device C3), then corresponding File-Modified-Date parameter FMD_2 is compared only with DMD_2, and any updates of FMD_2 are in accordance with clock CK3.

It should be noted that in both FIGS. 1 and 2, first computing device C1 has its own local clock CK1, and database organizer_1 includes a Package-Modified-Date, PMD, parameter identified as PMD_1. First computing device C1 uses clock CK1 for its normal processing tasks, and for updating, under criteria explained below, Package-Modified-Date parameter PMD_1 with a current time-stamp in accordance with clock CK1.

Preferably database organizer_1 and file packages package_1 through package_n are available on a network, and database organizer_1 controls the access to any of file packages, package_1 through package_n, on the network. Further preferably, the network is the internet.

As it is known in the art, a larger number of users attempting to access a single server can slow down the server. As it is further known in the art, the internet has a large number of users that can potentially slow down database organizer_1 if too many users attempt to access it at the same time. To mitigate this issue, it is known to provide multiple servers, each having copies of the available files, and to distribute the user load across the multiple servers.

The present invention contemplates such an approach, and further contemplates that the multiple servers be distributed across a large geographic area. This can lead to a complication. As it is explained above, any of the computing devices that store the local files (C2 and C3 in the embodiments of FIGS. 1 and 2) can update, edit, delete, or augment its collection of local files. Since each of the multiple servers would ideally include its own database organizer having access to its own copies of local files stored in its own local computing devices, it becomes difficult to assure that all servers maintain exact copies if the local files if each server's local computing devices can be updated independently.

Using simple date stamps identifying the date of each file's last update is not a viable solution since each computing device has its own local clock, and it cannot be assured that all the local clocks will be synchronized. Further complicating the present problem is that the multiple servers may be distributed across multiple time zones such that even if two separate servers are updated simultaneously in different time zones, each will produce a different time stamp for the update.

The Package-Modified-Date parameter is used to address the present problem of how to synchronize multiple image servers that do not share a common local clock.

Figure 3:
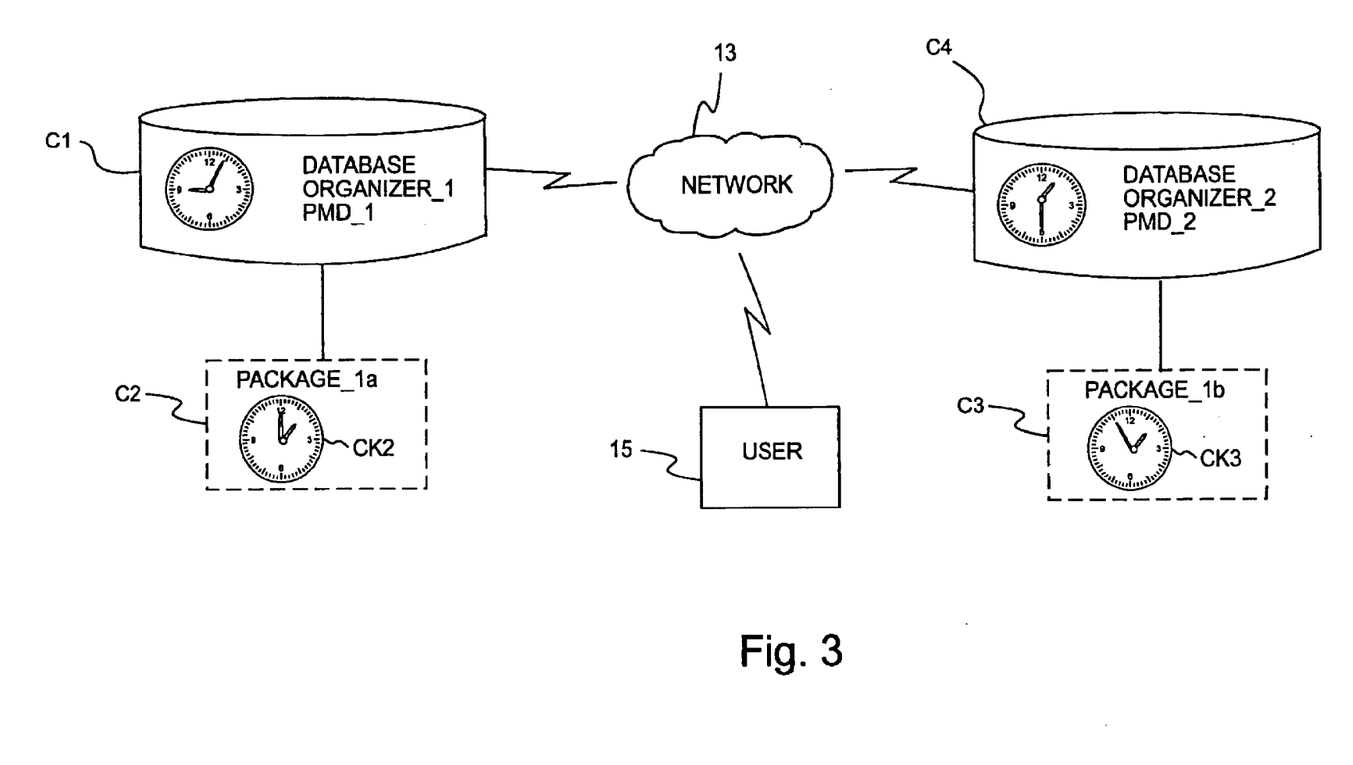
FIG. 3 is a block diagram of an organization system in according with the present invention showing the communication of two remote file servers.

With reference to FIG. 3, first computing device C1, from the embodiment of FIG. 2, is shown in communication with a fourth computing device C4 via a network 13. All elements similar to those of FIG. 2 have similar reference characters and are described above. As in the case of FIG. 2, first computing device C1 is shown having direct access to second computing device C2, which holds at least one package of local files, i.e. package_1a. Similarly, fourth computing device C4 functions as a second database organizer and maintains a descriptive record of local files in a fifth computing device C5, to which C4 has direct access. The local files in C2 are illustratively labeled package_1a and the local files in C5 are illustratively labeled package_1b, and package_1a and package_1b should ideally be duplicates of each other. That is, package_1a and package_1b should hold identical local files. In this way, either of database organizer_1 in C1 or database organizer 2 in C4 can service file requests from a remote user 15.

Since remote user 15 may communicate with either of database organizer_1 or database organizer_2 to access file package_1 (identified as package_1a in C2 and as package_1b in C5), and neither of package_1a nor package_1b is designated as a master copy of package_1 it is important to synchronize the contents of package_1a and package_1b. However, both of package_1a and package_1b may be edited independently, and thus it can be difficult to synchronize the two.

To address this problem, both database organizers incorporate a Package-Modified-Date parameter, PMD_1 in C1 and PMD_4 in C4. In a first embodiment, PMD_1 is dependent on CK1, the local clock within C1, and PMD_2 is dependent on CK4, the local clock within C4. The Package-Modified-Date parameter within either of C1 and C4 is updated under various conditions described below, and is used to help synchronize package_1a with package_1b.

In a first approach, each of first and second computing devices C1 and C4 have previously updated their respective PMD parameter in response to their respective database organizer being updated during a local synchronization routine with their respective local file package (i.e. package_1a or package_1b). As explained above, C1 communicates with C2 to maintain its database organizer_1 synchronized with changes to file package_1a. In a similar manner, C4 communicates with C5 to maintain its database organizer_2 synchronized with changes to file package_1b. Each time database organizer_1 is updated to synchronized itself with file package_1a in a manner to that described above in reference to FIGS. 1 and 2, parameter PMD_1 is updated with a time stamp as determined by CK1. Similarly, PMD_2 is updated with a time stamp as determined by CK4 each time database organizer_2 is updated to synchronize itself with package_1b (or other local file package, not shown) in a manner as described above in reference to FIGS. 1 and 2.

Any database organizer may initiate a database synchronization routine with any other database organizer via network 13. If either of database organizer_1 or database organizer_2 initiates a database synchronization routine with the other, the two database organizers exchange PMD parameters. The database organizer whose PMD time stamp is the most recent, is assumed to have the most up to date version of the file package in question (package_1 in the present case). For example, if PMD_1 is a more recent time stamp than PMD_2, then database organizer_2 is updated to match database organizer_1. Various factors, such as different time zones, may affect the determination of the most recent PMD parameter, and various methods for addressing these factors are contemplated within the present invention, as is explained more fully below.

Assuming that PMD_1 indicates a more recent update than PMD_2, then the updating of database organizer_2 may be accomplished in one of several ways. In a first approach, database organizer_1 sends to database organizer_2 the descriptive record of file package_1a. Database organizer_2 then compares the received descriptive record with that of package_1b. Differences are noted and updated. All files in package_1b that had their respective descriptive record updated are themselves updated in accordance with the received descriptive record. That is, they are either deleted if they are not shown in the received descriptive record, or they are replaced with corresponding files transferred from database organizer_1 via network 13 to database organizer_2. If the files in package_1b need to be updated, such as image files, then it is preferred that only the image files that need to be updated be transferred from via C1, C2 and network 13 to database organizer_2 and incorporated into package_1b. Any needed thumbnail images can be generated locally by either fourth computing device C4 or fifth computing device C5. Alternatively, all image files from package_1a could be transferred along with their descriptive record to database organizer_2 and package_1b.

As explained above, it is likely that first and second computing device, C1 and C2, may have differing time references (such as being in different time zones). Several alternate embodiments are proposed to address this problem. In a first alternate embodiment, first computing device C1 and fourth computing device C4 exchange current time stamps (in accordance with their respective local clocks CK1 and CK2) along with the initial exchange of their PMD parameter. C1 will note the difference in time between its current time stamp, as determined by it local CK1, and the received current time stamp from C4, which was generated according to CK4. First computing device C1 then adds the difference, positive or negative, to its PMD_1 parameter to produce a temporary comparison-only PMD_1 parameter, which is thereby shifted to the same time zone as PMD_2 of fourth computing device C4. C1 then compares the comparison-only PMD_1 parameter to parameter PMD_2 received from C4. In this manner, the time stamps of PMD_1 and PMD_2 are compared with a common time zone. Alternatively, the calculated time-zone difference can be added to, or subtracted from, PMD_2, as appropriate, instead of PMD_1 to shift PMD_2 to the time zone native to PMD_1. Fourth computing device C4 implements a similar routine to compare its local PMD_2 parameter with the received PMD_1 parameter.

In still an alternate embodiment, when ever either database organizer_1 or database organizer_2 is updated with a new descriptive record from a remote site, it stores the new descriptive record with a current time stamp received from the remote cite and associates that time stamp with the particular remote site. Also, whenever a local computing device, such as C1, receives a new synchronization request from the a remote site, i.e. C4, (along with the data record and PMD parameter from the remote site), the local computing device C1 compares the received PMD parameter from the remote site (i.e. PMD_2 in the present example) with the stored PMD previously associated with that site from a previous synchronization routine. If the newly received PMD parameter is more current, than the previously stored PMD parameter, then it is assumed that the remote site, C4, must have had its local files updated since the previous synchronization routine. If the local computing device C1 has not had its file package updated since the last time it synchronized itself with the remote site, C4, then it will assume that the remote site has the more current file package and permit itself to be updated with data from the remote site, C4, in a manner similar to that described above.

In the present embodiment, it is preferred that whenever either of computing devices C1 or C4 updates their own file package locally, they add a time stamp according to their local clock to the updated descriptive record (alternatively they may also update their respective PMD parameter according to their local clock). In this case, if the local computing device C1 has updated its own file package locally since the last time it synchronized itself with remote cite C4, then it will identify a first time span (determined as the time difference between its stored time stamp corresponding to its own local update and the current time according to its local clock, CK1) and also identify a second time span determined as the time difference between the newly received remote PMD parameter (i.e. PMD_2) and the remote current time stamp from remote cite C4. If the first time span is shorter than the second time span, then it is determined the local computing device C1 has the most current version of the data record and file package.

Otherwise, it is determined that the remote computing cite C4 has the most current version of the data record and file package. Whichever computing device, C1 or C4, is determined to have the most recent file package will update the data record and file package of the other computing device in a manner similar to that described above.

In the above examples, when ever a local machine, such as C1, is updated by a remote machine, such as C4, its PMD parameter is also updated. The PMD parameter may be updated with the PMD value from the remote machine. Alternatively, it may updated in accordance with its local clock. In all of the examples, it is likewise preferably that the PMD value of a machine be updated in accordance with its local clock whenever its any of its descriptive records (such as D1–Dn in FIG. 1) are updated. Thus, the PMD parameter of a machine will correspond to the most recent change to any of its descriptive record (i.e. D1–Dn).

It is to be understood that the routines described above for using PMD_1 and PMD_2 to synchronize C1 and C2, may also be used to synchronize C1 and C2 in FIG. 1. To apply the above discussion to C1 and C2, one would substitute FMD_1 in place of PMD_1 and substitute DMD_1 in place of PMD_2.

Figure 4:
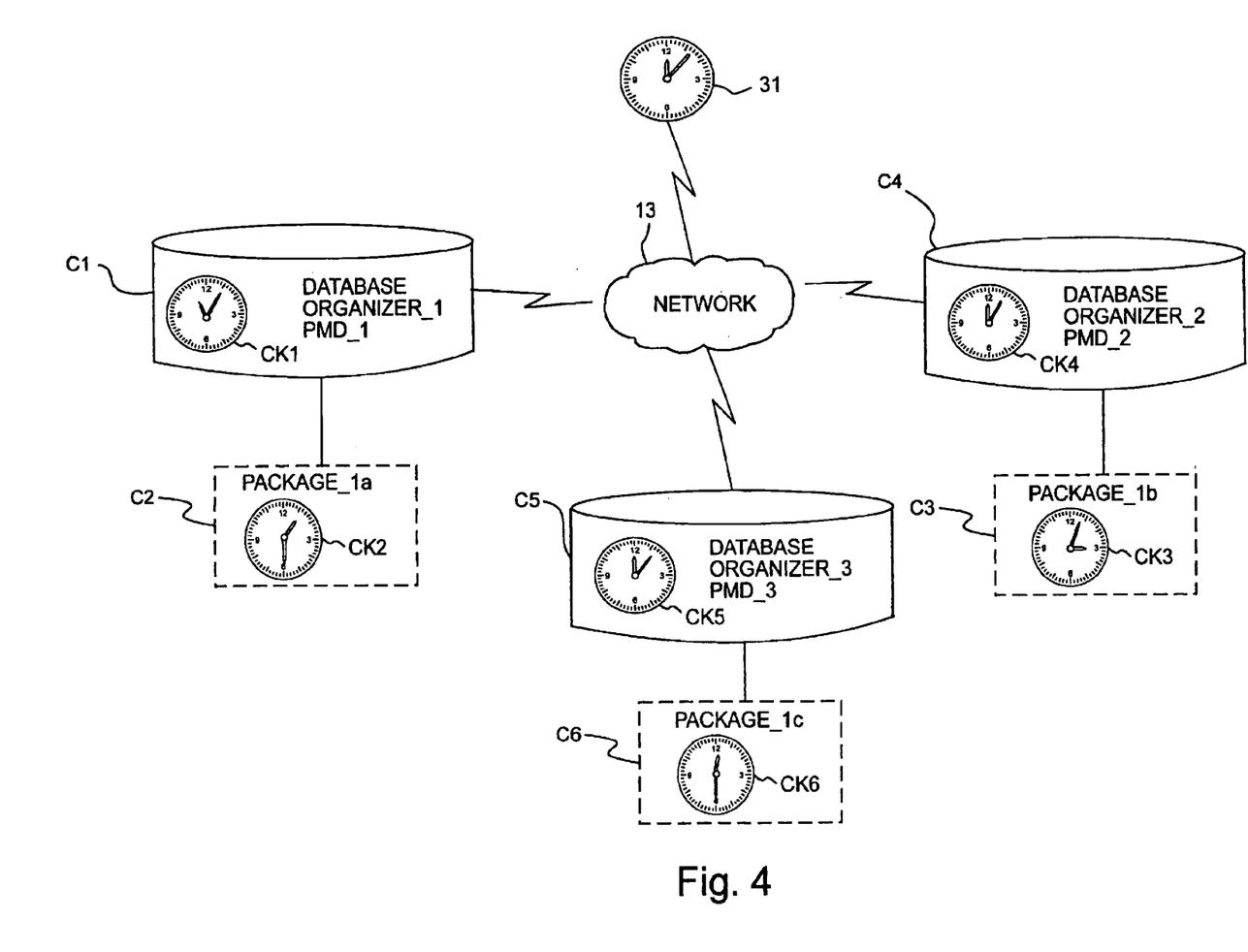
FIG. 4 is an alternate block diagram of an organization system in according with the present invention showing the communication of three remote file servers.

With reference to FIG. 4, an alternate architecture for synchronizing remote computing devices across different time zones and having different local clocks makes use of a dedicated reference clock 31. All elements in FIG. 4 similar to FIG. 2 have similar reference characters and are described above. In the present embodiment, three remote computing devices C1, C4, and C5 communicate with each other and with reference clock 31 via network 13. Computing device C5 has access to file package_3 in its local computing device C6 in a manner similar to that explained above in regards to C1/C2 and C4/C3.

Reference clock 31 may, for example, be a freely available clock reference such as the atomic clock available from the U.S. Naval Observatory, which is freely accessible via the internet. Alternatively, it may the local clock of a designated one of remote computing devices C1 to C6. In either case, when any of remote computing devices C1, C4, or C5 updates itself locally, or is updated remotely, its PMD parameter is determined based on the reference clock 31. In essences, the PMD parameter of all remote computing devices are synchronized to the same reference clock 31. In this way, the issues associated with multiple local clocks and differing time zones are eliminated.

Figure 5:
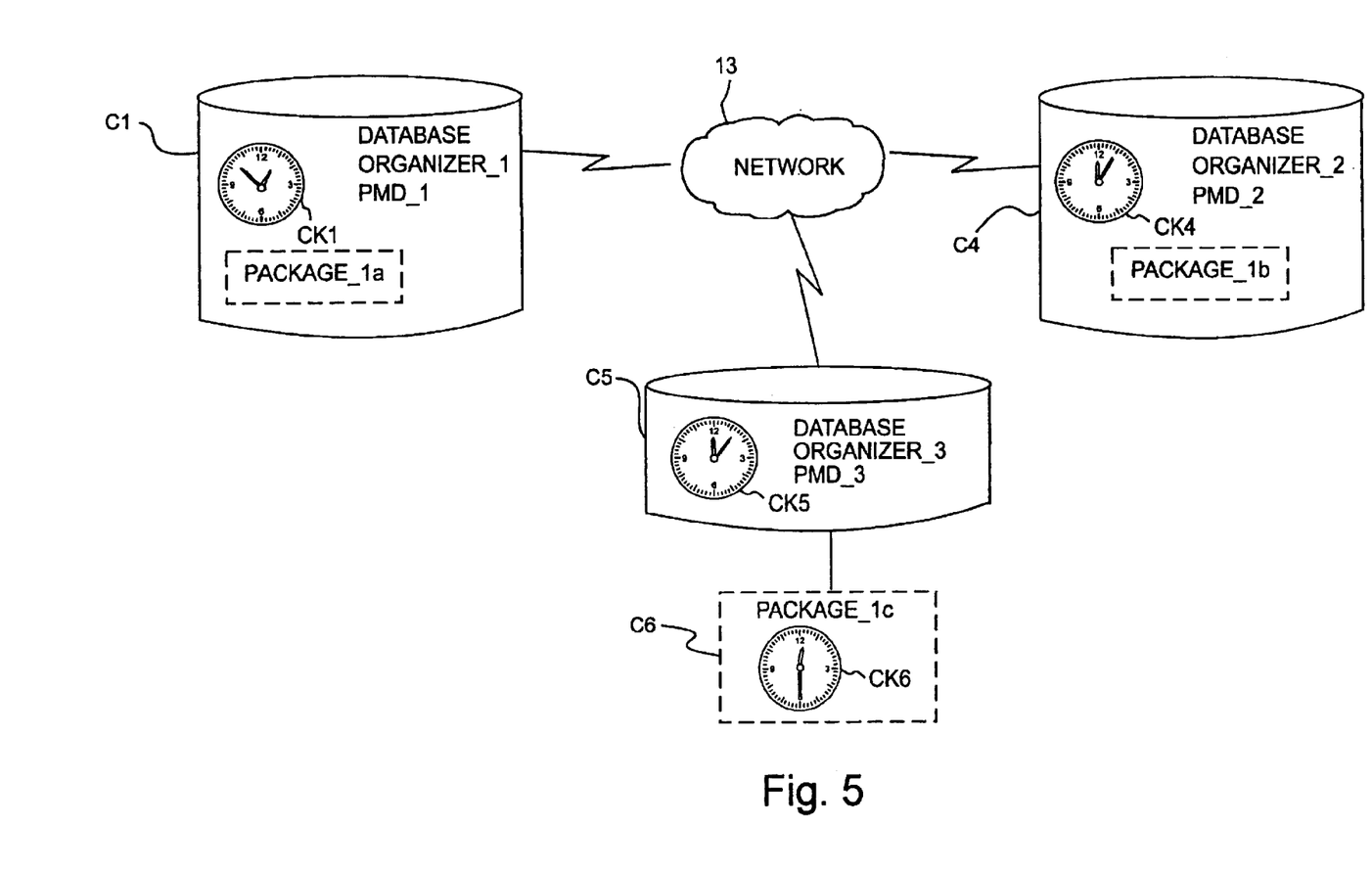
FIG. 5 is a second alternate block diagram of an organization system in according with the present invention showing the communication of three remote file servers.

With reference to FIG. 5, all elements similar to FIGS. 1–3 have similar reference characters and are described above. In FIG. 5, no common reference clock is used and synchronization of file packages 1a, 1b, and 1c among remote computing devices C1, C4, and C5/C6 across multiple time zones and differing local clocks is accomplished in a manner similar to that described in reference to FIG. 3 above. In the present embodiment of FIG. 5, database organizer_1 and file package_1a are both incorporated into a single computing device C1 such that their respective PMD and FMD parameters are both determined in reference to a single local clock CK1. Similarly, database organizer_2 and file package_1b are both incorporated into single computing device C4 such that their respective PMD and FMD parameters are both determined in reference to local clock CK4.

What is claimed is:

1. A file organization system comprising:

a first computing device having a first clocking reference and a first storage space;

a plurality of first local files stored in said first storage space, wherein said first storage space further has a dedicated first directory-modified-date, DMD, parameter updated to the current time according to said first clocking reference in response to a modification of said first storage space including at least one of the addition, deletion, and renaming of any of said first local files;

a second computing device having a first communication link with said first computing device and maintaining first statistical data, as supplied by said first computing device, on said first local files, said first statistical data including at least one of the name, the size, and the file type of said first local files, said first statistical data further including a first file-modification-date, FMD, parameter for storing a second modification date supplied by said first computing device, said second modification date being dependent on the most recent occurrence of a modification of any of said first local files as determined by said first clocking reference;

said first and second computing devices being effective for selectively implementing a first synchronization routine including the comparing of said first DMD parameter to said first FMD parameter, and responding to said first DMD parameter having a more recent modification date than said first FMD parameter by transferring update information on said first local files as determined by said first computing device to said second computing device for updating said first statistical data accordingly, and for resetting said first FMD parameter equal to said first DMD parameter.

2. The file organization system of claim 1, wherein said first synchronization routine further includes updating said first DMD parameter to the current time as determined by said first clocking reference prior to setting said first FMD parameter equal to said first DMD parameter.

3. The file organization system of claim 1, wherein said first FMD parameter is automatically updated to the current time according to said first clocking reference in response to any of said first local files being modified.

4. The file organization system of claim 3, wherein said first statistical data is updated with new local file statistical data along with said automatic updating of said first FMD parameter.

5. The file organization system of claim 1, wherein said first synchronization routine is implemented in response to a user request.

6. The file organization system of claim 1, wherein said synchronization routine is implemented in response to said first DMD parameter being updated.

7. The file organization system of claim 1, wherein at least a fraction of said first local files are image files, and wherein in said first synchronization routine, if said first DMD parameter is more recent than said first FMD parameter then said first computing device determines if any new image files are among said first local files and generates a new thumbnail file for each new image file and adds said newly generated thumbnail file to said first local files prior to transferring said update information, including information on said newly generated thumbnail image files, to said second computing device for updating said first statistical data.

8. The file organization system of claim 1, wherein in said first synchronization routine, if said first DMD parameter is more recent than said first FMD parameter then said first computing device determines if any files have been removed from said first local files prior to transferring said update information on said first local files, including a listing of all the removed files, to said second computing device for updating said first statistical data.

9. The file organization system of claim 1, wherein said second computing device includes access to a second clocking reference external to said first and second computing devices, and said first statistical data further includes a first package-modified-date, PMD, parameter updated to the current time according said second clocking reference in response to local file information in said first statistical data being updated.

10. The file organization system of claim 1, wherein said second computing device includes a second clocking reference internal to itself, and said statistical data further includes a first package-modified-date, PMD, parameter updated to the current time according said second clocking reference in response to local file information in said first statistical data being updated.

11. The file organization system of claim 10, wherein said first statistical data collectively constitutes a first file package corresponding to said first local files, and said file organization system further includes:

a third computing device having a third clocking reference and having a second file package consisting of second statistical data for a group of second local files, said second file package including a second PMD parameter updated to the current time according to said third clocking reference in response to second local file information in said second statistical data being updated;

a second communication link between said second computing device and a said third computing device;

each of said second and third computing devices being effective for selectively and independently initiating a second synchronization routine with the other of said second and third computing devices, the second or third computing device that initiates said second synchronization routine being designated as a source computing device and the other of said second and third computing devices being designated as a target computing device, wherein said second synchronization routine includes having said source and target computing devices compare their respective PMD parameters and if the PMD parameter of the source computing device is more current than the PMD parameter of the target computing device then sending the statistical data of the source computing device to the target computing device.

12. The file organization system of claim 11, wherein the statistical data from the source computing device replaces the statistical data in the target computing device.

13. The file organization system of claim 12, wherein the target computing device compares its own statistical data with the received statistical data from the source computing device to identify the differences, the target computing device further using the identified differences to update its own statistical data accordingly.

14. The file organization system of claim 13, wherein the target computing device determines if any of the identified differences indicate new or updated files and requests any identified new or updated files from the source computing device.

15. The file organization system of claim 14, wherein the source computing device sends only requested files to the target computing device.

16. The file organization system of claim 11, wherein the source computing device transfers all local files defined in its file package to the target computing device.

17. The file organization system of claim 11, wherein the target computing device sets its PMD parameter equal to the PMD parameter of the source computing device in response to having its statistical data updated with data from the source computing device's statistical data.

18. The file organization system of claim 11, wherein one of said second and third clocking references is designated a master clocking reference and the target computing device sets its PMD parameter to the current time according to said master clocking reference in response to having its statistical data updated with data from the source computing device's statistical data.

19. The file organization system of claim 11, further having a master clocking reference external to said source and target computing devices, wherein the target computing device sets its PMD parameter to the current time according to said master clocking reference in response to having its statistical data updated with data from the source computing device's statistical data.

20. The file organization system of claim 19, wherein said second and third computing devices access said master clocking reference via the internet.

21. The file organization system of claim 11, wherein the target computing devices includes an offset-time memory space wherein it stores a delta-time corresponding to the difference between its PMD parameter and the PMD parameter of the source computing device, the target computing device using the sum of its PMD parameter and said delta time as its official PMD parameter value in all future transactions with the source computing device.

22. The file organization system of claim 21, wherein said offset-time memory space is one of a register, a non-volatile memory, a RAM memory, and a magnetic recording device.

23. The file organization system of claim 21 wherein said offset-time memory space is part of the target device's statistical data.

24. The file organization system of claim 23, wherein said delta-time is not updateable by statistical data sent from the source computing device.

25. The file organization system of claim 11, wherein during said second synchronization routine, the source computing device sends a test time-stamp according to the current time of its clocking reference along with its PMD parameter to the target computing device, the determination of which of the source and target computing devices has the most current PMD parameter including:
the target computing device identifying an offset-time determined as the time difference between said test time-stamp and the current time of the target computing device's clocking reference; and
comparing the PMD parameter from the source computing device with the sum of the said identified offset-time and the PMD parameter from the target computing device.

26. The file organization system of claim 11, wherein during said second synchronization routine:
a first offset time is generated as the difference between the source computing devices' PMD parameter and the current time according to the source computing device's reference clock;
a second offset time is generated as the difference between the target computing devices' PMD parameter and the current time according to the target computing device's reference clock; and
the PMD parameter of the target computing device is determined to be the more recent if said second offset time is less than said first offset time.

27. The file organization system of claim 26, wherein the PMD parameter of the source computing device is determined to be the more recent if said second offset time is not less then said first offset time.

28. The file organization system of claim 11, wherein each of said second and third computing devices is further effective for maintaining a record of any changes to its PMD parameter since a previous one of said second synchronization routines, and wherein during a current synchronization routine, if the target computing device determines that its PMD parameter is different from source computing device's PMD parameter, then the target computing device determines that the source computing devices' PMD parameter is more current than its own if its own PMD parameter had not been changed since the previous second synchronization routine.

29. The file organization system of claim 11, wherein said second local files are resident on a second storage space having a fourth clocking reference, said second storage space further having a dedicated second directory-modified-date, DMD, parameter updated to the current time according to said fourth clocking reference in response to a modification of said second storage space including at least one of the addition, deletion, and renaming of any of said second local files; and
the statistical data of the Target computing device further includes a second FMD parameter corresponding to said second local files, said target computing device further setting its FMD parameter equal to the more recent of the source computing device's PMD parameter or said second DMD parameter.

30. The file organization system of claim 11, wherein said second communication link is through the internet.

31. A file organization system comprising:
a first network computing system having a first file package data store including first descriptive data of a first group of files and including a first package-modified-date, PMD, parameter that is updated in response to a change to said first descriptive data;
a second network computing system having a second file package data store including second descriptive data on a second group of files and including a second package-modified-date, PMD, parameter that is updated in response to a change to said second descriptive data;
a communication link coupling said first network computing system to said second network computing system; wherein
each of said first and second network computing systems are effective for selectively and independently initiating a package synchronization routine with the other of said first and second computing systems, the first or second computing system that initiates said package synchronization routine being designated as a source computing device and the other of said first and second computing systems being designated as a target computing device, wherein said package synchronization routine includes having said source and target computing devices determine which of their respective PMD parameter is indicative of a more recent time, and if the PMD parameter of the source computing device is indicative of a more recent time than the PMD parameter of the target computing device, then sending the file package data of the source computing device to the target computing device to be used to update the target computing device's file package data, the target computing device's PMD parameter being consequently updated.

32. The file organization system of claim 31, wherein said first and second network computing systems have access to a remote reference clocking source, wherein each of said first and second package-modified-date, PMD, parameters is respectively updated by setting it to the current time as determined by said remote reference clocking source.

33. The file organization system of claim 32, wherein each of said first and second network computing systems access said remote reference clocking source via the internet.

34. The file organization system of claim 31, wherein each of said source and target computing devices has a respective local clock and send a test-time-stamp of its current time as determined by its respective local clock along with its PMD parameter to the other of said source and target computing device during said package synchronization routine.

35. The file organization system of claim 34, wherein said determination of which of the source and target computing device's respective PMD parameter is indicative of a more recent time includes:
the target computing device identifying an offset-time determined as the time difference between its current time as determined by its local clock and the test-time-stamp received from the source computing device; and
the target computing device comparing the PMD parameter from the source computing device with the sum of the said identified offset-time and the PMD parameter from the target computing device.

36. The file organization system of claim 31, wherein said first PMD parameter includes a first part having a time stamp and a second part having a time-offset stamp, wherein only said first part is updated in response to a change to said first descriptive data initiated within said first network computing system, and both of said first and second parts are updated in response to a change to said first descriptive data resulting from the receipt of said second file package data due to said second network computing system being said source computing device and said first network computing system being said target computing device.

37. The file organization system of claim 36, wherein said first network computing system includes a first local clock and the current time according to said local clock is combined with said time-offset stamp and the total is used to update said first part of said PMD parameter in response to a change to said first descriptive data initiated within said first network computing system.

38. The file organization system of claim 37, wherein each of said source and target computing devices have a respective local clock and send their current time as determined by their respective local clock along with their PMD parameter, and said first network computing system updates said second part of said first PMD parameter by setting it equal to the difference of its local time as determined by its respective local clock and the local time received from the source computing device.

39. The file organization system of claim 31, wherein each of said source and target computing devices has a respective local clock, and said determination of which of the source and target computing device's respective PMD parameter is indicative of a more recent time includes:

generating a first offset time as the difference between the source computing devices' PMD parameter and the current time according to the source computing device's local clock;

generating a second offset time as the difference between the target computing devices' PMD parameter and the current time according to the target computing device's local clock; and determining that the PMD parameter of the target computing device is indicative of a more recent time if said second offset time is less than said first offset time.

40. The file organization system of claim 39, wherein the PMD parameter of the source computing device is determined to be indicative of a more recent time if said second offset time is not less then said first offset time.

41. A file organization system comprising:

a first storage space having a plurality of first local files, said first storage space having a dedicated directory-modified-date, DMD, parameter for storing a first modification date, said first modification date being updated to the current time according to a first clocking reference in response to a modification to said first storage space including at least the addition, deletion, renaming, or editing of any said first local files;

a second storage space maintaining statistical data on said first local files, said statistical data including at least one of the name, the size, and the file type of said first local files, said second storage space having a folder-modification-date, FMD, parameter for storing a second modification date, said second modification date being updated to the current time according to a second clocking reference in response to a modification to any existing one of said first local files;

a communication link between said first storage space and said second storage space for selectively comparing said DMD parameter with said FMD parameter, said first and second storage spaces responding to said DMD parameter having a more current modification date than said FMD parameter by transferring update file information from said first storage space to said second storage space, using the transferred update file information to modify said statistical data accordingly, and setting said FMD parameter equal to said DMD parameter disregarding said second clocking reference.

42. The file organization system of claim 41, wherein said first storage space and said second storage space are resident within a common computer system, said first and second clocking references being based on a clock within said common computer system.

43. The file organization system of claim 42 wherein said first and second clocking references are substantially the same.

44. The file organization system of claim 41, wherein said first storage space is resident on a first computer system and said second storage space is resident in a second computer system, said first clocking reference being based on a first clock within said first computer system and said second clocking reference being based on a second clock in said second computer system.

45. The file organization system of claim 44, wherein said second storage space further includes a package-modification-date, PMD, parameter, and said first computer system further responds to said DMD parameter being more recent than said FMD parameter by determining if a new image file has been added to or removed from said first local files, and said first computer system responding to a new image file having been added to said first local files by generating a thumbnail image file of the new image file, said first computer then sending statistical data of all newly created files and removed files to said second computer system to update said statistical data accordingly, and said second computer setting said PMD parameter to the current time according to said second clocking reference and said first computer setting said DMD parameter to the current time according to said first clock reference.

46. The file organization system of claim 44, wherein:

said first storage space is one of a plurality of local storage spaces each having a respective DMD parameter and a respective group of said local files;

said second storage space further maintaining a separate FMD parameter and a separate group of said statistical data corresponding to each of said respective groups of local files;

each of said plurality of local storage spaces selectively initiating a compare sequence to compare its respective DMD parameter to its corresponding FMD parameter, and responding to its respective DMD parameter being more recent than its corresponding FMD parameter by transferring update file information for its respective group of local files to said second storage space, said second storage space using the transferred update data to modify the corresponding group of statistical data accordingly, and setting the corresponding FMD parameter equal to the DMD parameter of the corresponding local storage space that initiated said compare sequence.

47. The file organization system of claim 44, wherein said first storage space maintains a record of all modifications to its local files since its last comparison of its DMD parameter with said FMD parameter of said second storage space, transfers the information in said record to said second storage space to update said statistical data, and erases the contents of its record following updating of said statistical data.

* * * * *

UNITED STATES PATENT AND TRADEMARK OFFICE
CERTIFICATE OF CORRECTION

PATENT NO. : 6,938,045 B2
DATED : August 30, 2005
INVENTOR(S) : Chia-Hsin Li et al.

It is certified that error appears in the above-identified patent and that said Letters Patent is hereby corrected as shown below:

Column 14,
Line 8, change "and a" to -- and --.

Signed and Sealed this

Fourth Day of April, 2006

JON W. DUDAS
*Director of the United States Patent and Trademark Office*